May 24, 1966 M. O. SCHUR 3,252,387
APPARATUS FOR FABRICATING TUBE BODIES
Original Filed Sept. 4, 1962 11 Sheets-Sheet 1

INVENTOR.
MILTON O. SCHUR
BY R. J. Strickler
ATTORNEY

May 24, 1966  M. O. SCHUR  3,252,387
APPARATUS FOR FABRICATING TUBE BODIES
Original Filed Sept. 4, 1962  11 Sheets-Sheet 2

INVENTOR.
MILTON O. SCHUR
BY
ATTORNEY

INVENTOR.
MILTON O. SCHUR
ATTORNEY

May 24, 1966 M. O. SCHUR 3,252,387
APPARATUS FOR FABRICATING TUBE BODIES
Original Filed Sept. 4, 1962 11 Sheets-Sheet 4

INVENTOR.
MILTON O. SCHUR
BY
ATTORNEY

May 24, 1966  M. O. SCHUR  3,252,387
APPARATUS FOR FABRICATING TUBE BODIES
Original Filed Sept. 4, 1962  11 Sheets-Sheet 5

INVENTOR.
MILTON O. SCHUR
BY K. J. Stittler
ATTORNEY

May 24, 1966  M. O. SCHUR  3,252,387
APPARATUS FOR FABRICATING TUBE BODIES
Original Filed Sept. 4, 1962  11 Sheets-Sheet 6

INVENTOR.
MILTON O. SCHUR
BY
ATTORNEY

May 24, 1966 M. O. SCHUR 3,252,387
APPARATUS FOR FABRICATING TUBE BODIES
Original Filed Sept. 4, 1962 11 Sheets-Sheet 7

INVENTOR.
MILTON O. SCHUR
BY
ATTORNEY

May 24, 1966  M. O. SCHUR  3,252,387
APPARATUS FOR FABRICATING TUBE BODIES
Original Filed Sept. 4, 1962  11 Sheets-Sheet 8

INVENTOR.
MILTON O. SCHUR
BY
ATTORNEY

INVENTOR.
MILTON O. SCHUR
BY

ATTORNEY

May 24, 1966 M. O. SCHUR 3,252,387
APPARATUS FOR FABRICATING TUBE BODIES
Original Filed Sept. 4, 1962 11 Sheets-Sheet 11

INVENTOR.
MILTON O. SCHUR
BY
ATTORNEY

United States Patent Office 3,252,387
Patented May 24, 1966

3,252,387
APPARATUS FOR FABRICATING TUBE BODIES
Milton O. Schur, New Haven, Conn., assignor, by mesne assignments, to Owens-Illinois, Inc., Toledo, Ohio, a corporation of Ohio
Original application Sept. 4, 1962, Ser. No. 221,263, now Patent No. 3,202,566, dated Aug. 24, 1965. Divided and this application Dec. 10, 1964, Ser. No. 425,990
1 Claim. (Cl. 93—81)

This application is a division of co-pending application Serial No. 221,263, filed September 4, 1962, now U.S. Patent No. 3,202,566, issued August 24, 1965.

The present invention relates to apparatus for fabricating tube bodies.

The language "wound convolutely" is intended to denote a generally concentric winding of sheet stock material into a tubular formation where there is substantially no lead (no helix is generated) or axial advance of a given layer of stock relative to an adjacent layer as ordinarily occurs in helically wound tubular bodies already well known in the art.

The term "blank" is intended to designate composite or unitary stock material in the form of flat sheets or in the form of a roll of stock material susceptible of unwinding and of continuously advancing to a cutting station where the stock is converted continuously into flat sheets by a suitable cutting operation.

It is well to note at this time that many prior art tube winding methods and devices, such as disclosed in U.S. 2,734,432, involve a helical winding step in forming a tube.

In such operations the tube is advanced continuously in an axial direction as it is wound and is continuously in motion, axially, passing over and moving away from a mandrel upon which the tube winding occurs.

In processes where tube bodies are wound upon and/or continuously advanced over mandrels, difficulty is frequently encountered because of a tendency for the tube to adhere to the mandrel especially when the surface of the stock is coated with resinous material such as polyethylene. This problem is magnified if heat is utilized or if the stock material is tightly wound.

The present invention does not involve this adhesion problem because the tube body is not advanced axially during fabrication.

In helical winding processes it is necessary to reciprocate a cutting element, to and fro, along a path generally parallel to the longitudinal axis of the tube to eliminate relative motion in an axial direction (between the tube and the cutter during cutting) in order to make a clean, square, transverse cut across the tube when converting it into tube segments.

Mechanisms for reciprocating the cutters in the above fashion are complicated and their inertia limit production speeds.

In addition, the helically wound tube presents a problem of label registering particularly when the label is applied helically.

Inherently a helically wound tube also develops a relatively long lap seam in comparison to a given axial length of helical tubing. It is desirable to keep a seam as short as possible to minimize vulnerability to seam leakage.

In contrast, the present invention provides a tube body having the shortest possible lap seam relative to a given axial length of tube.

A further feature of the invention is the provision of a method and apparatus for winding tube bodies within a tube former or housing.

A blank embracing certain features of the present invention and useful to create a tube body by convolute winding may comprise a sheet or web of body stock having a repetitive label indicia laminated (or printed) on one side of the stock and a coating or film of barrier material laminated to the opposite side of the stock to define a first pattern and a coating of adhesive applied to the said opposite side to define a second pattern.

A process embracing certain principles of the present invention and useful for winding blanks convolutely to develop tube bodies which are convertible into tube segments may comprise the steps of feeding the blank into a cylindrical tube former, said blank having a leading edge and a trailing edge, winding the blank within the tube former to develop a tube body having a wall structure defining at least one layer of body stock, the leading edge of said blank being disposed on the interior of said body and the trailing edge being disposed on the exterior of the body and thereafter separating the tube body by a plurality of transverse cuts to develop a plurality of tube segments.

An apparatus operable to practice the process of the present invention utilizing a blank embracing the principles described above may comprise at least one fixed hollow housing having a generally circular interior as viewed in cross section, a rotatable, elongated mandrel disposed in said housing, means for rotating said mandrel relative to the housing, means for positioning said mandrel relative to said housing so that the exterior surface of the mandrel and the interior surface of the housing form a nip and a feed opening communicating with the interior of the housing so that a blank of stock material may be fed into the housing through said opening to enter said nip whereupon the blank is drawn into the housing and wound convolutely within the housing by the cooperation between said rotary mandrel and said fixed housing.

Other features and advantages of the present invention will become more apparent when read in conjunction with the appended drawings in which:

FIGURE 29 is a view of the securing bolt for the tube former.

In general, the tube segments are made by advancing a web of body stock in a first direction while simultaneously laminating a label indicia to the bottom side and applying at least a pattern of barrier material and a pattern of adhesive to the top side.

The prepared stock is continuously cut into sections or blanks where the blanks correspond to a given number of tube segments ultimately fabricated from the blank.

The direction of advance of the blanks is changed abruptly to a second direction and the side edge thereof adjacent the pattern of barrier material becomes a leading edge as the blank is fed into a longitudinal slit in a tube former.

The tube former comprises a generally tubular member having a regular or smooth interior surface generally defining a circle in cross-section.

The tubular member is fixed and is fitted with an internal, rotatable mandrel. The mandrel is so disposed relative to the tubular member that the external surface of the mandrel and the internal surface of the tubular member form a bite or nip.

The blank is fed through the slot, leading edge first, into the nip with the result that the rotation of the mandrel relative to the tubular member is effective to drive the blank along an arcuate path while being guided by the smooth interior surface of the tubular member operative to wind the blank convolutely into a multi-walled tubular body with the leading edge of the blank on the interior of the body and the trailing edge on the exterior of the body.

The convolute tubular body, thus formed, is cut into a plurality of tube segments ready for further fabrication into containers.

Referring now in detail to the drawings and to FIGS. 1 through 5, in particular, there is shown, schematically, an apparatus for making blanks useful in the practice of the present invention.

The reference numeral 10 designates a web of body stock which, in the illustrated embodiment of the invention, is a web of kraft paper advancing continuously from a supply roll 11 in the direction of the arrow and drawn by driven pinch rolls 12, 13 and 14.

The body stock 10 advances over idler pulley 16 to laminating rolls 17 where the body stock is laminated to a barrier material 18 which, in the disclosed embodiment of the invention, is a web of polyvinylidene chloride.

The web of barrier material 18 advances from the supply roll 19 and passes over adhesive applicator 21 and is thereafter bonded to the body stock 10 at the laminating rolls 17. In the succeeding claim, the barrier material may be referred to as a first pattern or a barrier pattern.

Depending upon the liner requirements of the containers ultimately fabricated from the tube segments produced by the practice of the present invention, it is contemplated that various barrier materials may be utilized and applied to the body stock by laminating a web thereto (as in the present disclosure, for example) or the barrier material may be applied to the body stock in the form of a coating by painting, spraying or utilization of a doctor blade.

A roll of label stock 22 in the form of a web 20 having printed thereon, repetitively, a comercial label indicia is advanced continuously over idler roller 23 past adhesive applicator 24 to pinch rolls 26 where the label stock is laminated to the underside of the body stock 10 to produce a web of composite stock identified by the reference numeral 27. The label indicia faces downwardly as viewed in FIG. 1.

The repetitive character of the label indicia must be correlated with the axial length and number of individual tube segments, ultimately fabricated, so that one pattern of label indicia becomes individual to each tube segment. That is, the label indicia 20 must be oriented relative to the stock 10 and the side of the label indicia pattern must be so selected that the exterior surface of the finished tube segments carries a well oriented, symmetrically arranged label pattern.

Obviously the invention contemplates that the repetitive label indicia can be applied to the underside of the body stock 10 by direct printing thereon as surface conditions and as manufacturing procedures of the body stock permit.

Figure 18:
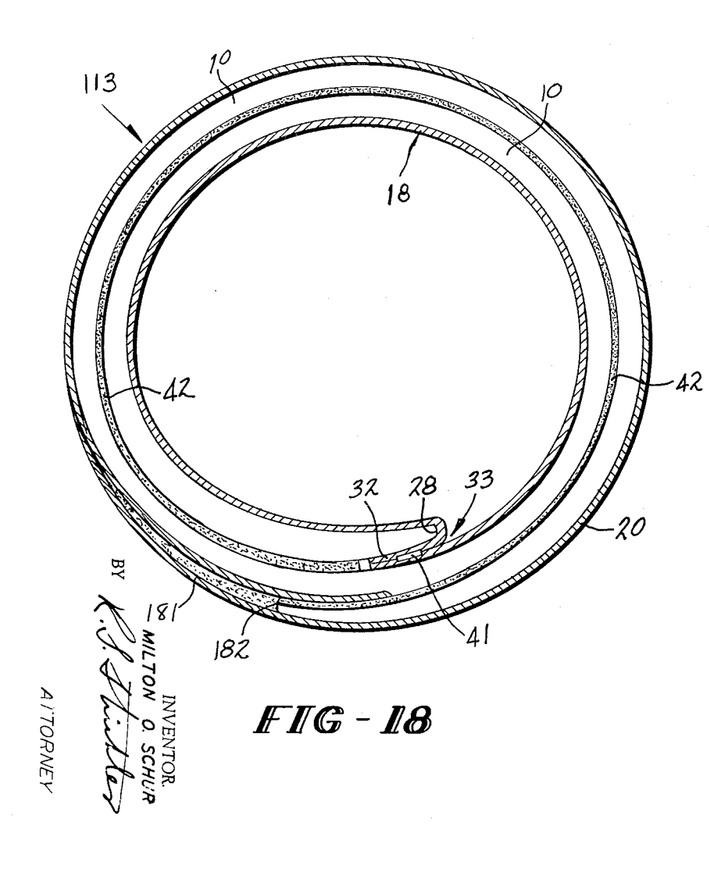
FIG. 18 is a cross-section of a typical tube segment made in accordance with the present invention.
Figure 19:
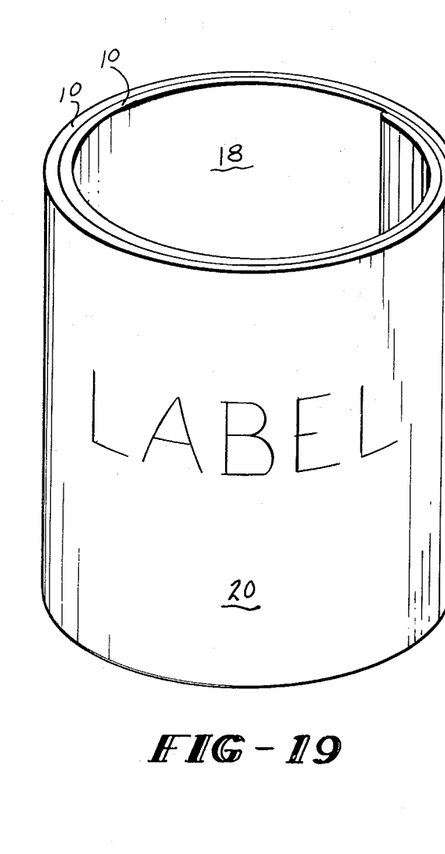
FIG. 19 is a perspective view of a typical finished tube segment.

As will be more apparent hereinafter and as shown in FIGS. 18 and 19, label stock indicia ultimately appear on the exterior of the finished tube segment while the barrier material 18 falls on the interior of the finished segment.

Frequently it is desirable to protect or seal the edge 28 (FIGS. 4 and 18) of the body stock 10 with barrier material to avoid presenting any uncoated surface to products ultimately packaged within the tube segment.

If edge sealing is desired, the barrier material 18 is displaced slightly relative to the body stock 10 (displaced upwardly as viewed in FIG. 4) to provide a margin of barrier material projecting over the body stock 10 as at 29.

Figure 20:
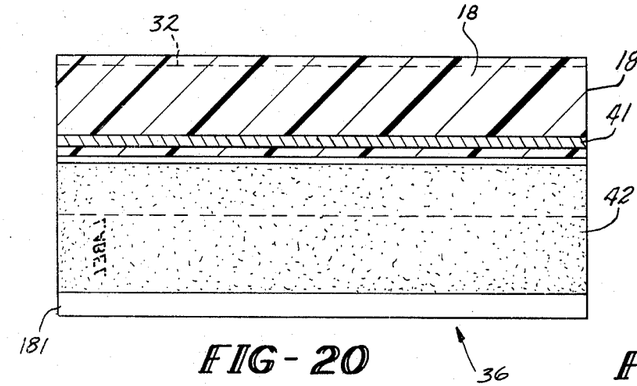
FIG. 20 is a plan view of a tube blank prior to winding.

A suitable edge folding device is provided at 31 to fold continuously a projecting margin over and around the edge 28 of the body stock 10 to provide a narrow ribbon 32 of barrier stock upon the bottom or underside of the body stock as is most apparent in FIG. 18 and in FIG. 20.

The ribbon 32 is particularly useful when it is desired to seal the barrier material directly to barrier material to make a lap seam such as the lap seam indicated by the reference numeral 33 in FIG. 18.

Obviously when the barrier material is applied by spraying, painting or doctor blades, it is anticipated that suitable applicators will be utilized to coat the edge 28 and to develop the ribbon or band 32.

Referring again to FIGS. 1 through 5, note that the composite stock 27, having been fully laminated by the time it reaches edge folder 31, proceeds to the right, as viewed in FIG. 1, as a unitary structure and advances to cutter rolls 34 where the composite stock 27 is cut continuously into blanks comprising uniform lengths of flat stock identified by the reference numerals 36, 37 and 38.

At this point a second pattern and a third pattern of material is added to the composite stock 27 now existing in the form of tube body blanks identified by the reference numerals 36, 37 and 38. See, also, FIGS. 20 through 22.

As stated previously, barrier material 18 applied to the body stock 10 may be sometimes referred to hereinafter as a first pattern.

In the disclosed embodiment of the invention, the barrier material is poly vinylchloride.

Figure 21:
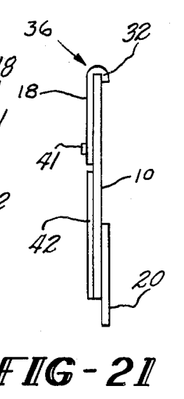
FIG. 21 is an end view of the blank of FIG. 20.

The second pattern is applied by barrier sealer applicator 39 which, in the disclosed embodiment of the invention, comprises a ribbon of a suitable plastisol identified by the reference numeral 41 in FIGS. 20 and 21 effective to provide a tight seal in the longitudinal seam 33. A plastisol compatible with a barrier of poly vinylchloride is comprised of a Saran type poly vinylidene resin dissolved in three parts of an equal mixture of tetrahydrofuran and toluene.

Depending upon the particular barrier material utilized, it may be necessary to adjust or change the nature of the compound applied by applicator 39 to insure a proper sealing reaction with the barrier material.

Figure 4:
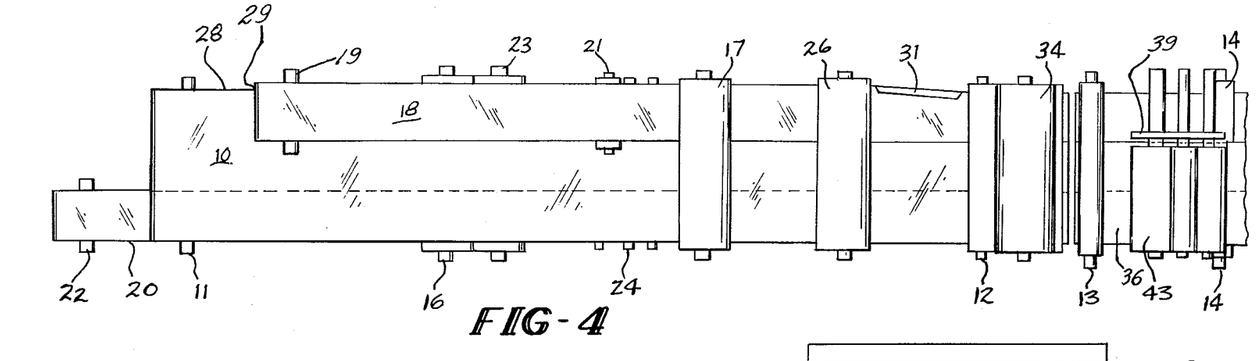
FIG. 4 is a plan view of FIG. 1.

The third pattern on the top of the composite stock as viewed in FIGS. 4, 20 and 21 comprises a coating of adhesive 42 applied by adhesive applicator 43.

Figure 22:
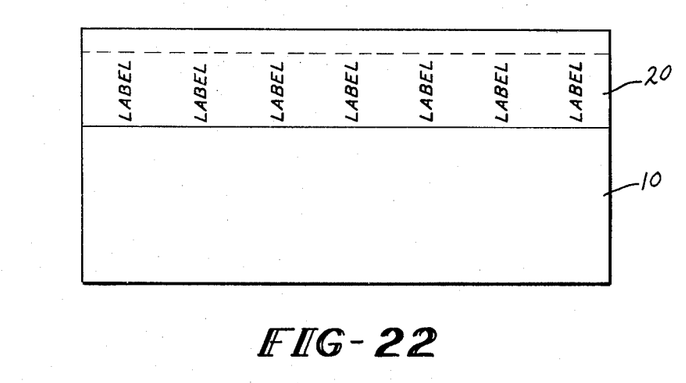
FIG. 22 is a view of the bottom side of the blank of FIG. 20.

Thus, by way of review, the top side of tube blanks 36, 37 and 38, the details of which are shown in FIGS. 20, 21 and 22 are coated with at least three patterns defining a first pattern of barrier material 18 and a second pattern of barrier activator material 41, such as an adhesive, operable to seal two layers of barrier material to define a lap seam 33 (FIG. 18).

The third pattern comprises the adhesive coating 42 used to bind the convolutions of body stock 10 together also apparent in FIG. 18.

After the three patterns just described have been applied to the tube blanks, pinch rolls 14 are operative to drive each blank in sequence to idler pulley 44 and thence into a blank accelerator indicated generally by the reference numeral 46.

Figure 5:
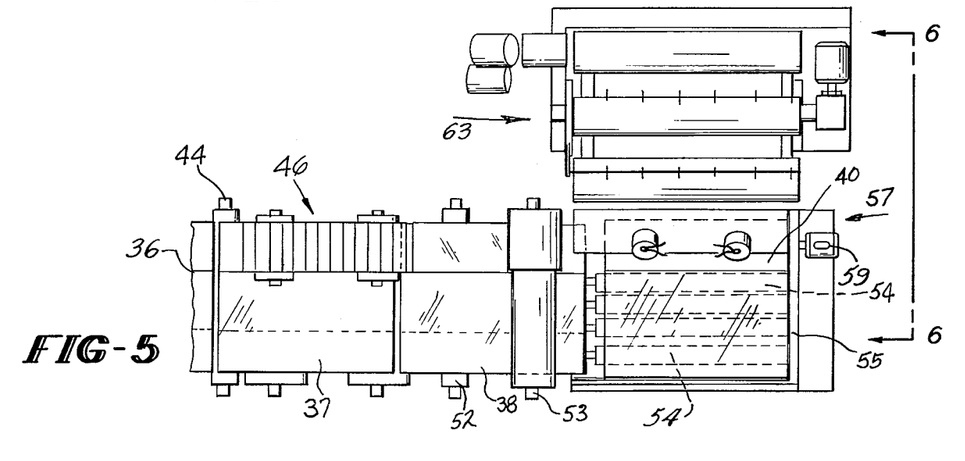
FIG. 5 is a plan view of FIG. 2.

The accelerator comprises a pair of cooperating endless belts 47 and 48 each having blank engaging fingers or tines 49 and 51 operate to engage the blank 37, for example, in the region of barrier pattern 18, as is apparent in FIG. 5, to propel the blanks to the right at an accelerated speed for a reason which will become more apparent hereinafter.

A typical speed of advance for the stock material may be of the order of 200 feet per minute and the accelerator ordinarily increases this speed to about 400 feet per minute.

Although the blank may be advanced by the accelerator 46 by grasping and driving it in any suitable fashion, it appears advisable to grasp the blank along the pattern of barrier material 18 because it presents a dry surface in contrast to the tacky character that ordinarily exists at the surface of the glue pattern 42.

Referring again to FIGS. 1, 2, 3, 4 and 5, note that blank 38 upon departing from accelerator 46 passes over idler pulley 52 and enters pinch rolls 53—53 in turn operative to direct the blank onto a bed of laterally spaced idler rolls 54—54 and the blank comes to rest against frame 55.

BLANK FEEDER

Figure 27:
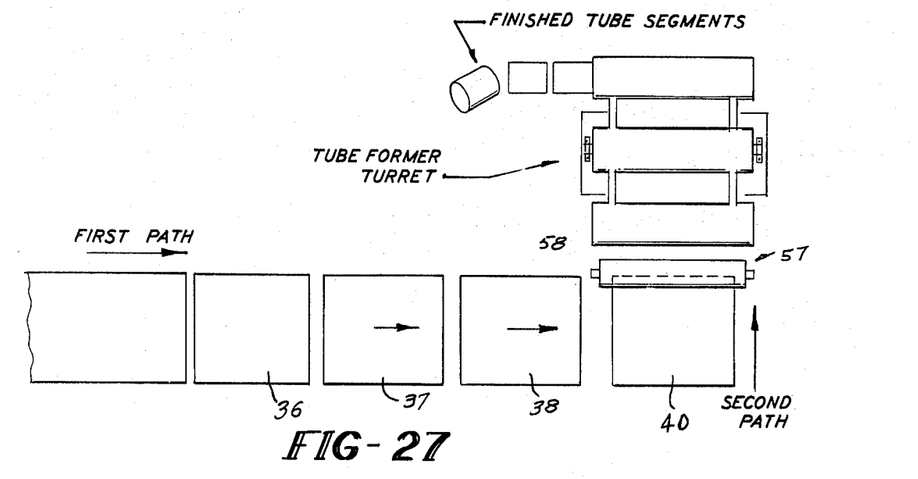
FIG. 27 is a schematic layout showing the direction of advance of the body stock and blanks during the course of fabrication of tube segments; and, FIG. 28 is a perspective view of an alternative design of the tube former.

At this point, the direction of advance of the blank 38 changes from the first path to a second path as shown schematically in FIG. 27 and the blank is received by a blank feeder device, indicated generally by the reference numeral 57.

Figures 6, 7, 8:
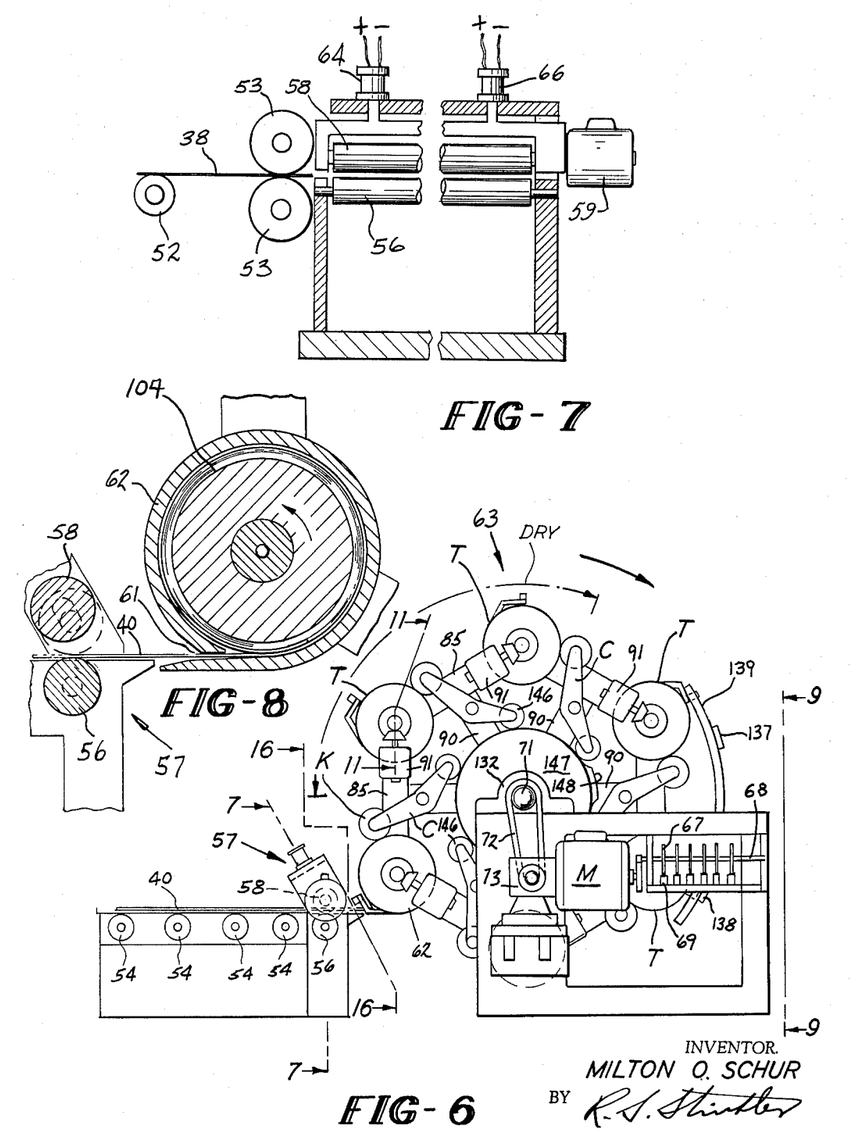
FIG. 6 is a side view of FIG. 5 as viewed in the plane of the line 6—6.
FIG. 7 is a sectional view of a portion of the illustration of FIG. 6 as viewed in the plane of line 7—7.
FIG. 8 is an enlarged view of a portion of FIG. 6 showing the junction of the blank feeder and a tube former with certain parts broken away for clarity.

The feeder device comprises an idler roll 56 (see FIGS. 6, 7 and 8) which cooperates with a reciprocating roll 58, driven by motor 59, to grasp the margin of the blank carrying the dry barrier material 18 and propel it into a feed slot 61 of a tube former 62 carried by a uniformly rotating turret 63 just as the turret brings the tube former 62 into register in the fashion shown in FIGS. 6 and 8.

Referring in detail to FIGS. 6, 7, 8 and 10, note that the driven roll 58 of blank feeder device 57 is reciprocable by solenoids 64 and 66 from an open position in which roll 58 is spaced from roll 56 to receive a blank, to a closed position in which it makes a driving connection with the blank in the manner of a pinch or ringer roll.

Cam 67 carried by shaft 68 is operable to actuate microswitch 69 in timed relationship relative to the rotation of the former turret 63 to actuate solenoids 64 and 66 at the proper time.

As will be more apparent hereinafter, cam shaft 68 carrying a number of cams is powered through suitable gear reduction by main motor M which also acts to drive main turret shaft 71 in the direction shown through V-belt 72 and gear box 73.

The cam 67 actuates the solenoids 64 and 66 sequentially and the driven roll 58 engages and drives the blank just as the slot 61 falls in register with the leading edge of the blank. The driven roll remains in contact with the blank for an interval of the order of 100 milliseconds and is thereafter withdrawn to avoid contact with the tacky adhesive pattern 42 on the trailing edge of the blank (see FIG. 20).

The function of the other cams upon cam shaft 68 will be as described as the specification proceeds.

Turret 63 is driven in the direction shown at about 5 r.p.m., preferably at a uniform speed, by motor M. Cam shaft 68, driven through a suitable gear reduction and in timed sequence relative to the rotation of turret shaft 71, sequentially presents a tube former T to the blank feeder device 57 at the instant the feeder is operative to drive a blank tangentially through the elongated feed opening 61.

TUBE FORMER

The details of a tube former unit T, sometimes referred to as a "gobbler," are shown in FIGS. 6, 11, 12 and 17. A generally cylindrical tubular housing 81, formed with an elongated, tangentially disposed feed slot 82 is supported in turret 63 by four bracket members 83, 84 and 85 (only three appear in FIGS. 6 and 11). The interior surface 80 of the housing 81 is highly polished and is generally circular in cross-section.

The housing 81 is fitted with a cap 86 carrying bearings 87 and 88 operable to support shaft 89 in turn supporting a mandrel indicated generally by the reference numeral 90. The housing 81 is fixed to brackets 83, 84 and 85 and the mandrel 90 is rotated relative to the housing by motor 91 through bevel gears 92 and 93 and shaft 89. The shaft 89 is formed with a hollow core 94, spaced radial openings 96 and a fluid pressure tight swivel fitting 97 to provide a conduit for pressurized air from a source (to be identified later) through tube 95 to mandrel power means or bellows devices 98 and 99.

In addition to the shaft 89 and the bellows devices 98 and 99, the mandrel 90 comprises a plurality of spaced anvils 101, 102 and 103 each keyed to the shaft 89 and rotatable therewith. Interposed between the anvils are spaced pairs of deformable, resilient plastic nip rolls or back-up rolls 104 and 106.

Sandwiched between the pairs of nip rolls 104 and 106 are bellows devices 98 and 99, respectively. Each bellows device includes a pair of shoes 109—109, slidable axially on shaft 89. The shoes are enclosed by a diaphragm 111. O-rings 112 make a suitable shaft air seal so that upon introduction of fluid pressure through radial shaft opening 96, the shoes 109—109 are separated axially with the result that the nip rolls are expanded or swelled radially from the position shown in solid lines in FIG. 11 to the dotted line position. Thus, the rolls 104 and 106 in cooperation with the interior surface 80 of the housing 81 form a resilient nip or bite which upon rotation of the mandrel 90 act to draw a blank (such as the blank 40, FIG. 8) fed from blank feeder device 57 through feed slot 61 (or slot 82 in FIG. 12) to wind the blank convolutely into a tubular body.

The reference numeral 113 of FIG. 18 discloses a representative embodiment of the tube body developed and the result is a multi-ply wall structure comprising several layers of body stock 10, barrier material 18, adhesive 42, label stock 20 with barrier material sealer material 41.

If during the course of winding the tube body 113 or during ejection of the finished tube segments, lubrication is desired between the interior surface of the housing 81 and the exterior layer of the tube body, it is contemplated that air under pressure be applied to the interior of the housing 81 through conduit 110 and manifolds 114, 116 and 117.

The anvils 101, 102 and 103 cooperate with knives 119 carried by shaft or rod 121 to cut the tube body 113 into a plurality of tube segments 122, 123 and 124.

The tube body 113 rotates during the course of winding and continues to rotate after fully wound driven by the mandrel 90 as it rotates relative to the housing 81.

The rotation of the tube body is utilized to effect the cutting of the tube body 113 into tube segments 122, 123 and 124 wherein a cutter cam means, operable in a manner to be described later, is effective, at timed intervals, to move cutter knives 119 from the dotted line position shown in FIGS. 11 and 12 to the solid line position thereof so that the knives are received in slots 126, encounter the rotating tube body and cut the tube body against corresponding anvils 101, 102 and 103.

The knives 119 need not rotate and obviously the tube body 113 can be cut into any desired number of tube segments.

The cut tube segments 122, 123 and 124 are ejected axially to the left, as viewed in FIG. 11, by means of an ejector 127 actuated periodically by a cam and follower arrangement to be described in connection with the description of the tube former turret 63.

Figure 17:
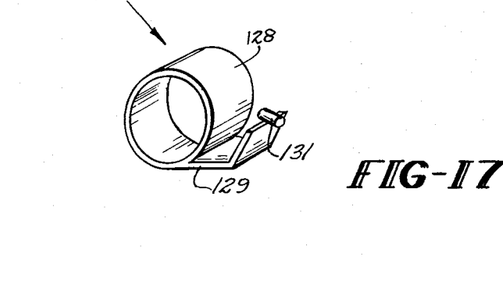
FIG. 17 is a perspective view of a stripper device utilized to strip tube segments from the tube former.

A perspective view of the ejector 127 is shown in FIG. 17 and comprises a circular sleeve 128 having an arm 129 secured tangent to the sleeve and terminating in a cam follower 131. The arm 129, sleeve 128 and follower 131 are normally disposed in the position shown in FIG. 11 and the arm 129 is received within and is operative to slide along feed slot 82 (FIG. 12) when actuated by the engagement of follower 131 with its cam slot.

TUBE FORMER TURRET

Figures 9, 10:
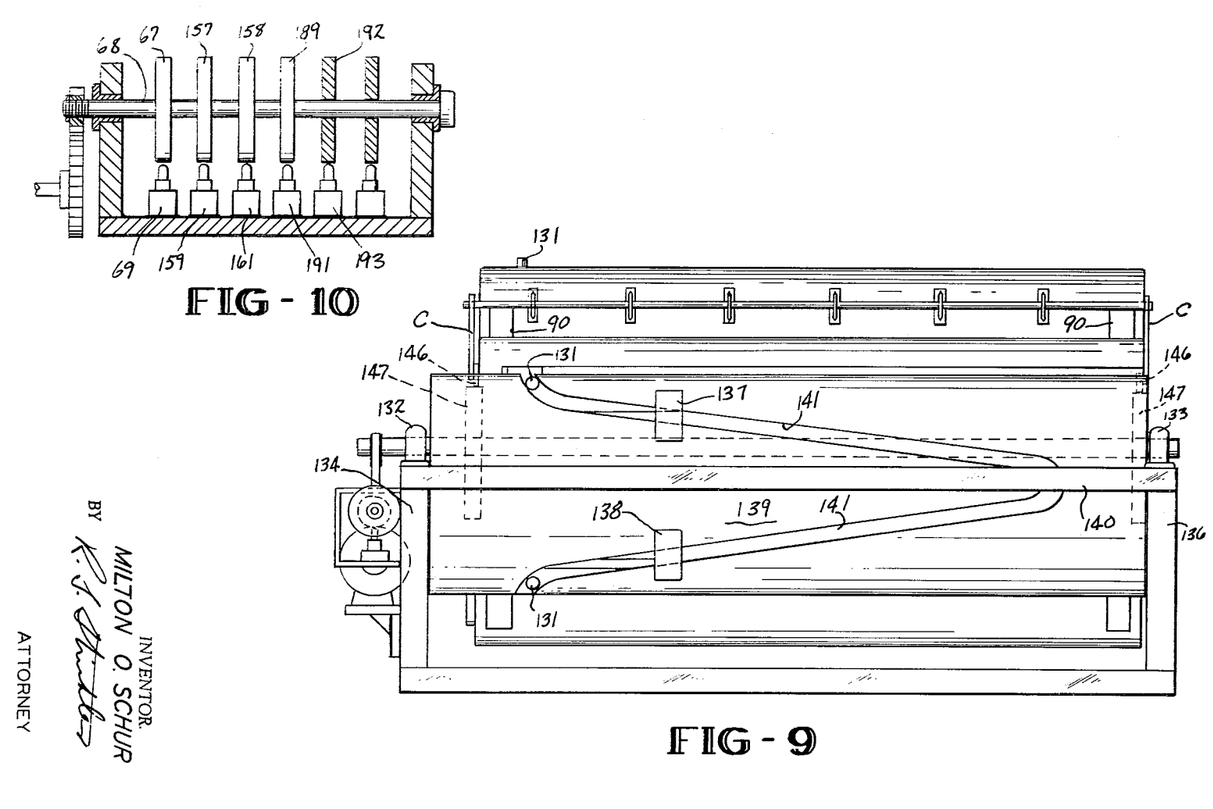
FIG. 9 is a side view of the illustration of FIG. 6 as viewed in the plane represented by the line 9—9 showing the mechanism for ejecting finished tube segments from the tube former at the tube ejection station.
FIG. 10 is an enlarged view of a portion of the illustration of FIG. 6 showing a plurality of microswitches actuated by the tube former turret.
Figure 16:
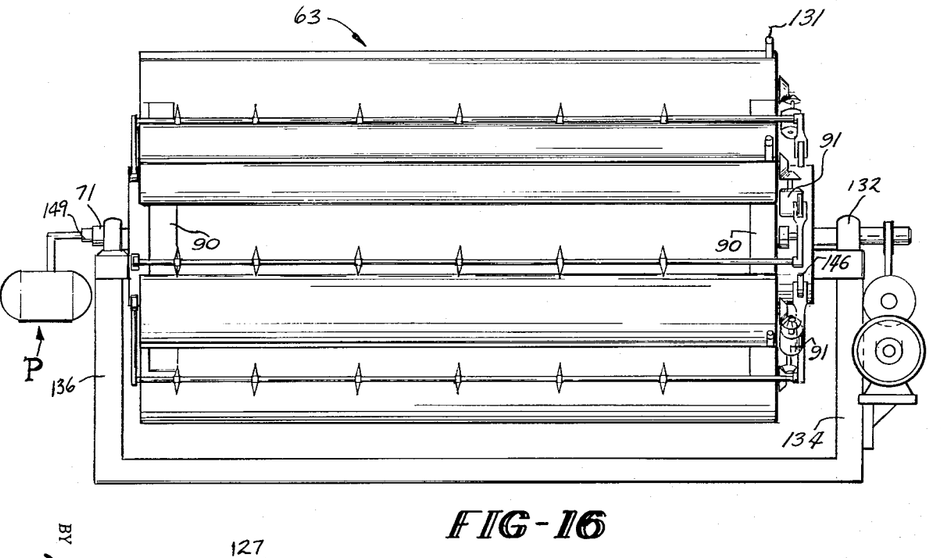
FIG. 16 is a view of the tube former turret of FIG. 6 as viewed in the plane of the line 16—16.

Referring now to FIGS. 6, 9 and 16, note that the tube former turret 63 comprises six equally spaced tube formers T supported by brackets 83, 84, 85 and 90 in turn supported for rotation by turret shaft 71. The turret shaft 71 is carried in pillow block bearings 132 and 133 fixed to frame members 134 and 136.

The turret frame members 137, 138 and 140 support an arcuate cam plate 139 having a generally parabolic cam slot 141 engageable sequentially by cam followers 131 effective to move ejector sleeve 128 to the right as viewed in FIG. 9 to eject tube segments and to return the sleeve to the normal position after ejection.

As previously described, each mandrel 90 is driven independently, preferably at 180 r.p.m., by motors 91 individual to each tube former.

The knives 119, individual to each tube former, are mounted at spaced intervals upon the rod 121 and the spacing of the knives determines the number of tube segments 122, 123 and 124 ultimately fabricated (see FIGS. 8 and 27).

The rods 121 are supported at opposed ends in crank arms C. The crank arms are centrally and pivotally supported upon turret brackets 90 and carry a cam follower 146 which cooperates with a cam 147 rigidly fixed to the turret frame so that as the turret 63 rotates in the direction shown (FIG. 6), cam 147 is operative to move the knives of each tube former into an operative position in sequence as the various followers encounter cam projection 148.

COMPRESSED AIR SYSTEM

Figures 11, 12:
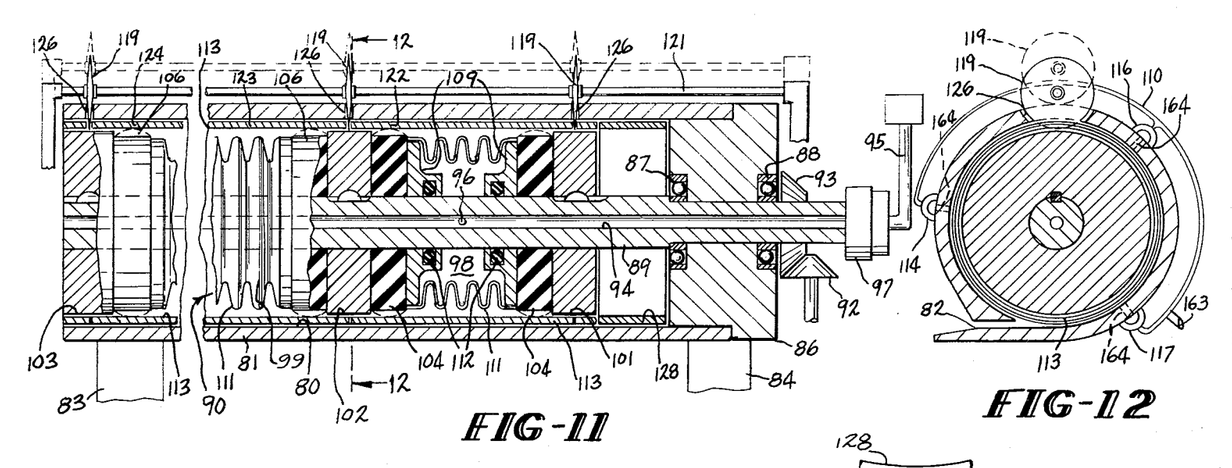
FIG. 11 is a longitudinal section of a tube former of FIG. 6 as viewed along section line 11—11.
FIG. 12 is a sectional view of FIG. 11 as viewed in the plane of line 12—12.

Referring now to FIGS. 10, 11, 12, 16 and 26, note that the tube former turret 63 includes a compressed air system effective to (1) operate the bellows devices of FIG. 11 and (2) provide a cushion of air or air lubrication between the interior surface of the tube former and the exterior surface of the blank being wound.

A conveniently located compressor P supplies air under pressure (in the disclosed embodiment the air pressure is of the order of 75 p.s.i.) to the main shaft 71 of the turret 63 through a suitable air tight rotatable fitting 149.

Air under pressure is then directed via conduit 150 through solenoid valves 151 to 156, suitable rotatable fittings 97, to the core 94 of each tube former shaft 89. Radial shaft openings 96 provide a passage for air to the interior of each bellows device diaphragm as shown in FIG. 11.

Valves 151 to 156 are operable by solenoids in well known fashion and have two basic positions, namely, (1) operative, in which air pressure is directed through the valve to all the bellows devices of a given tube former effective to swell the resilient rolls 104 and 106 and (2) exhaust, in which air pressure within the bellows devices of a given tube former is vented and reduced to atmospheric pressure through exhaust vent V.

The valves 151 through 156 are operated sequentially and in timed relationship relative to the rotation of the tube turret 63 by the cooperation between cams 157 and 158 and microswitches 159 and 161.

The cam 157 is provided with six humps or high spots and cooperating microswitch 161 is operable to pressurize the bellows devices of each tube former in sequence.

The cooperation between cam 158 and microswitch 161 act to set valves 151 to 156 in the exhaust position sequentially.

A typical cycle for converting a tube blank into a plurality of tube segments corresponds to one revolution of the turret 63 and it is preferred that the bellows devices 98–99 of a given tube former T be under pressure for all of the cycle except the interval during which tube segments are being ejected—i.e., while a given tube former ejected follower 131 (see FIG. 9) is making a working connection with the ejector cam 141.

As stated previously, the bellows devices 98–99 are pressurized to swell the resilient rolls 104 and 106 to form a nip or bite; obviously, the rolls 104 and 106 must be relaxed to free the completed tube segments from the bite prior to ejection by the ejector sleeve 128.

The air pressure necessary to lubricate the internal surface of each tube former is much less than the pressure necessary to actuate the bellows devices, thus, a pressure reducing valve 162 is provided to drop the compressor pressure to about 35 p.s.i.

Figure 26:
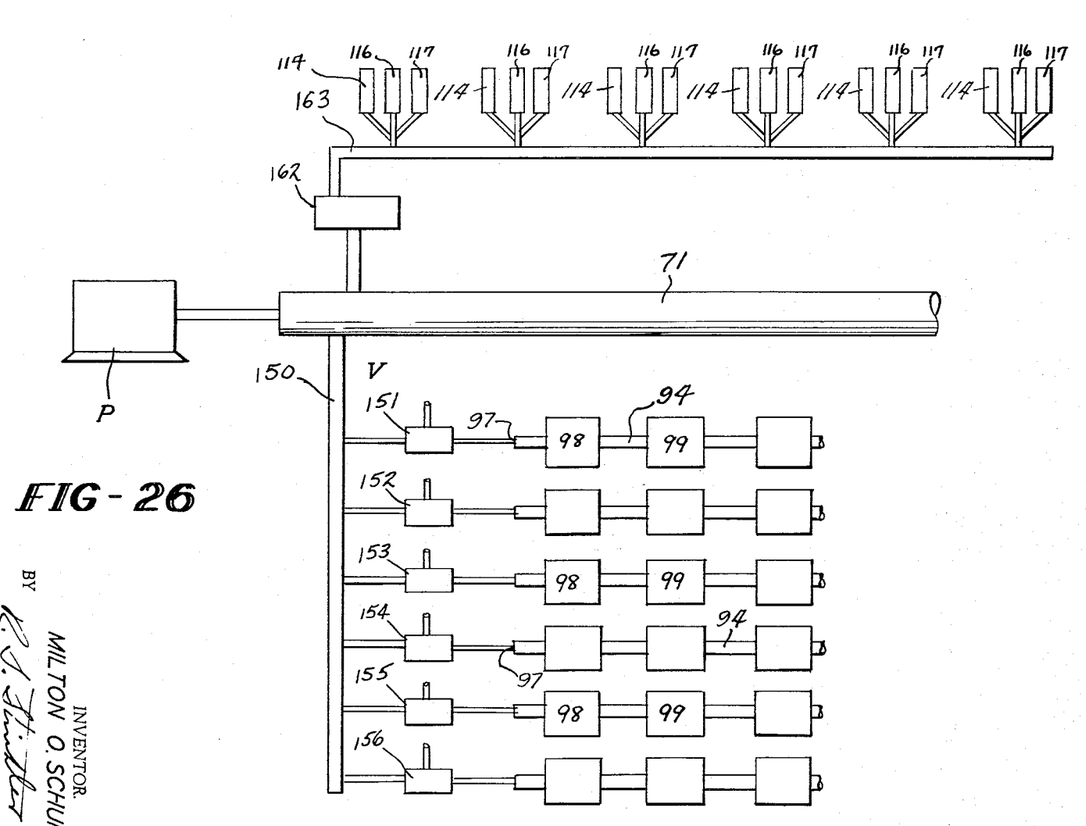
FIG. 26 is a schematic diagram of the air system leading to the tube former bellows and the tube former manifolds.

The valve 162 is secured to the main turret shaft 71 and air is directed through the valve to conduit 163 feeding each tube former manifold 114, 116 and 117 as shown in FIGS. 12 and 26.

Air is fed constantly to each manifold. The air enters the interior of the tube formers through radial openings 164 and then bleeds to atmosphere.

The use of air as a lubricant between the interior surface of the tube former and the exterior surface of the blank is not always essential to the fabrication of tube segments and may be eliminated as frictional relationship between the interior of the tube former and the surface of the blank dictate.

OPERATION

The operation of the process and apparatus disclosed and described thus far is as follows:

A web of body stock 10 is laminated to a web of barrier material 18 and a web of label stock 20.

The edge 28 of the body stock 10 and the underside near the edge are sealed with barrier material.

Next the composite stock 27 is cut into blanks 36, 37 and 38.

The label side of the blanks carry a number of complete representations of repetitive label indicia indicated by the legend "LABEL" where the number of complete representations of the repetitive indicia corresponds to the number of tube segments ultimately fabricated.

That is, a blank bearing five complete representations of label indicia is a blank which is convertible into five tube segments.

Obviously the invention is not limited to the number of tube segments fabricated from each blank.

A pattern of barrier activator is applied by applicator 39 and a pattern of body stock adhesive is applied at applicator 43.

Obviously the sequence of the cutting step and those steps performed at applicators 39 and 43 is not critical and the sequence may be selected or changed as considerations of convenient manufacturing procedures dictate.

The composite stock 27 proceeds through the cutting step at a linear speed of about 200′ per minute. Next the accelerator increases the linear speed of each blank to about 400′ per minute and the advance of the blank along this path is terminated when it fetches up against frame 55 (FIG. 2).

Figures 1, 2, 3:
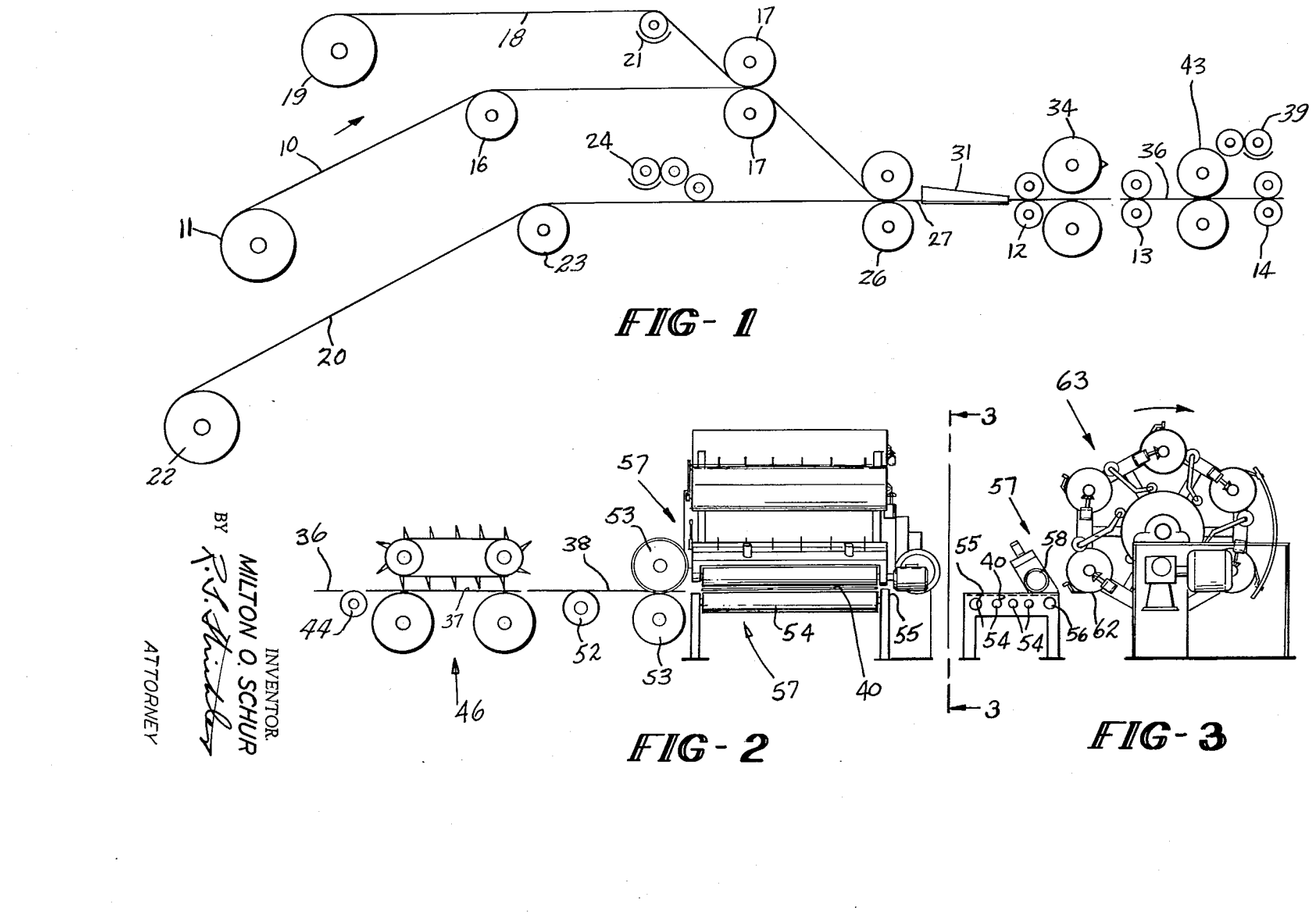
FIG. 1 is a side view of a portion of an apparatus useful to process blanks.
FIG. 2 is a continuation side view of the illustration of FIG. 1.
FIG. 3 is a side view of FIG. 2 as viewed in the plane of the line 3—3.

At this time the cam shaft 68 is operating and the turret 63 is rotating in the direction shown in FIG. 3. In timed sequence relative to the rotation of the turret, cam 62 actuates cooperating microswitch 69 to drop reciprocating roll 58 into working relationship with its mating roll 56 effective to feed the blank 40 into the feed slot 61 (see FIGS. 6 and 8) just as the tube former T′ falls into register with the bite of the rolls 56 and 58.

The blank now proceeds along a new path generally normal to the first direction of travel (see FIG. 27).

The rolls 56 and 58 are in contact for a fraction of a second (of the order of 100 milliseconds) and the blank 40 is projected into the bite developed by the constantly rotating mandrel 90 and the interior surface of the fixed housing T′.

It is to be noted that at this time the bellows device of T′ is pressurized and the resilient rolls 104 and 106 are distended or swelled (see FIG. 11) so that the blank is tightly seized and tightly wound into at least a two-ply convolute structure similar to the illustration of FIG. 18.

Obviously, the width of the blank W (see FIG. 20) controls the number of layers of plies in the wall of the tube body developed.

The width is not critical so long as there is at least a partial overlap of the leading and trailing edges of the blank.

The mandrel 90 rotates constantly at about 180 r.p.m. and the blank is wound into a tubular body smartly.

As the turret rotates through the arc labelled DRY in FIG. 6, the adhesive 40 (FIG. 18) is given an opportunity to set or dry.

If desirable, heat may be applied during this portion of the turret cycle to accelerate setting the adhesive.

As tube former T′ and its associated knives K approach the end of the arc labelled DRY, follower 171 encounters hump 172 formed on fixed cutter cam 173 effective to rotate the cutters K from the position shown in FIG. 6 to the position shown in FIG. 11.

Since the formed tubular body 113 is rotating at about 180 r.p.m., knife K is effective to cut the body into a plurality of tubular segments.

As the tube former T′ reaches cam plate 139, follower 131 engages cam track 141 (see FIG. 9). Simultaneously cam 158 operates microswitch 161 to set the appropriate valve 151–156 to the exhaust position thereby venting the bellows devices of tube former T′ to atmosphere. This action allows the resilent rollers 104 and 106 to return to their normal position (solid line position in FIG. 11) relieving the bite or nip between the rolls 104 and 106 and the interior surface of the tube former.

The result is that the tubular segments 122, 123 and 124 are free to move axially out of the tube former.

As the turret continues to rotate, follower 131 traverses the cam slot 141 and the ejector 127 is driven axially (to the left as viewed in FIG. 11) with the result that tubular segments are discharged from the tube former as shown in FIG. 27.

Although air lubrication or the air cushion previously described is not always essential, it may be required to facilitate ejection of the tubular segments depending upon the material from which the segments are fabricated.

With continued rotation of the turret, follower 131 continues to traverse the cam slot 141 and the ejector 127 is returned to its original or starting position shown in FIG. 11.

As the turret continues to rotate cam 157 signals the inflation of the bellows devices within the tube former so that the rolls 104 and 106 expand to form a nip ready to receive the next tube blank as the tube former moves into register with the blank feeder 57.

The turret continues to cycle and the operation just described continues.

In the practice of the process steps and in the operation of the apparatus just described, it is possible to produce tubular segments of the type disclosed in FIG. 19 having a double wall of body stock 10, a label and a layer of barrier material on the interior at rates in excess of 100 such tubular segments per minute where the segment has a 4 inch diameter and a 5½ inch length.

DOUBLE BLANK

Figure 23:
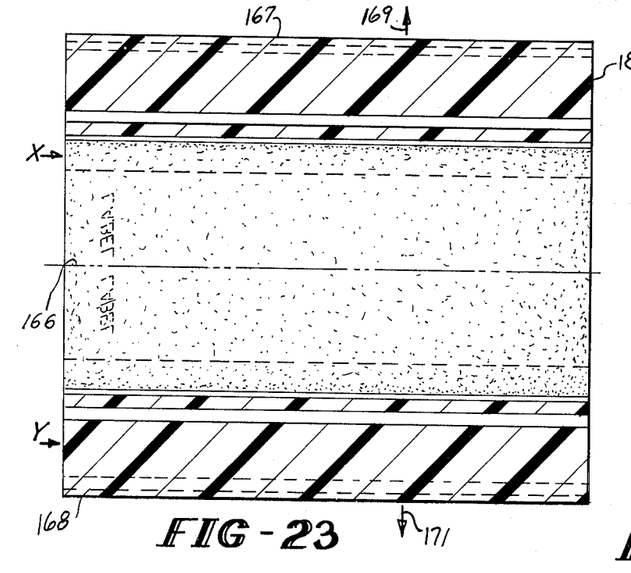
FIG. 23 is a top plan view of a double blank.
Figure 24:
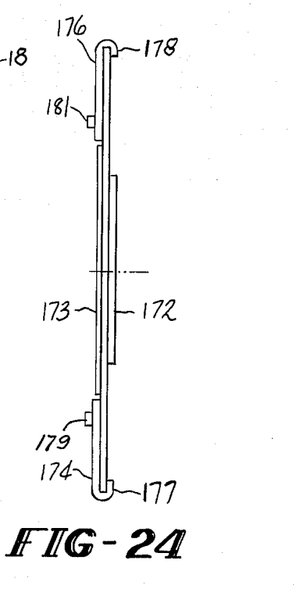
FIG. 24 is an end view of the blank of FIG. 23.
Figure 25:
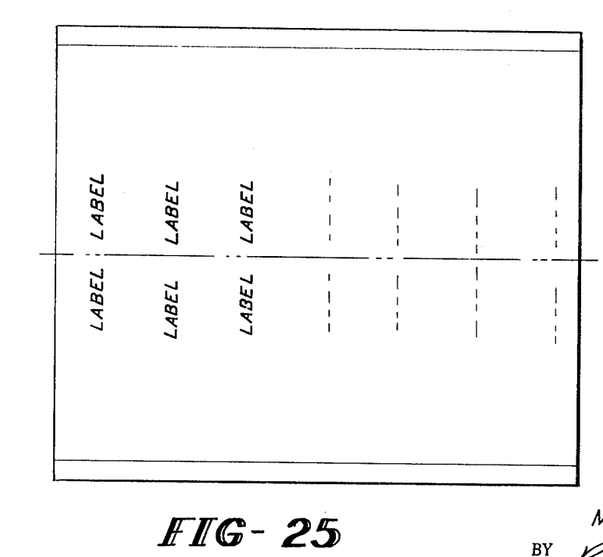
FIG. 25 is a corresponding view of the bottom side of said tube blank.

Referring now to FIGS. 23, 24 and 25, there is shown an alternative blank structure, hereinafter referred to as a double blank, useful in the practice of the disclosed process steps and in the operation of the apparatus of the present invention when it is desired to feed two turret devices 63 simultaneously.

For purposes of establishing perspective relative to the blank and its direction of advance towards two tube formers, consider the double blank of FIG. 23 cut into two symmetrical single blanks along the line referenced 166.

Thus, the leading edge of blank X is referenced 167 and the leading edge of blank Y is referenced 168, and their direction of advance toward the tube forming turret is indicated by the arrows referenced 169 and 171, respectively.

Obivously, the trailing edge of each blank X and Y coincides with the line referenced 166.

Prior to cutting the blank is laminated with a double width repetitive label pattern 172 and a double width adhesive pattern 173. Each margin of the double blank is laminated with a barrier material pattern 174 and 176.

Opposed edges of the blank are covered with barrier material by return bend portions referenced 177 and 178 and a pattern of barrier activator appears referenced 179 and 181.

The double blank structure disclosed in FIGS. 23, 24, and 25 makes it possible to begin with a double width roll of body stock and injects the additional step of slitting the blank longitudinally along the line referenced 166 prior to introduction into tube former turrets disposed adjacent the leading edges 167 and 168 respectively.

LABEL PROJECTION—SINGLE BLANK

Referring to FIGS. 18, 20, 21 and 22, it is apparent that the label stock 20 may be offset relative to the composite stock 10 to develop a margin or tail 181 to provide a smooth termination or lap seam for the label stock.

The tail 181 eliminates the step 182 that would otherwise occur at the trailing edge of the blank.

Alternatively the label stock may fall flush with the trailing edge of the blank as desired.

ALTERNATIVE TUBE SEGMENT EJECTOR

Figures 13, 14, 15:
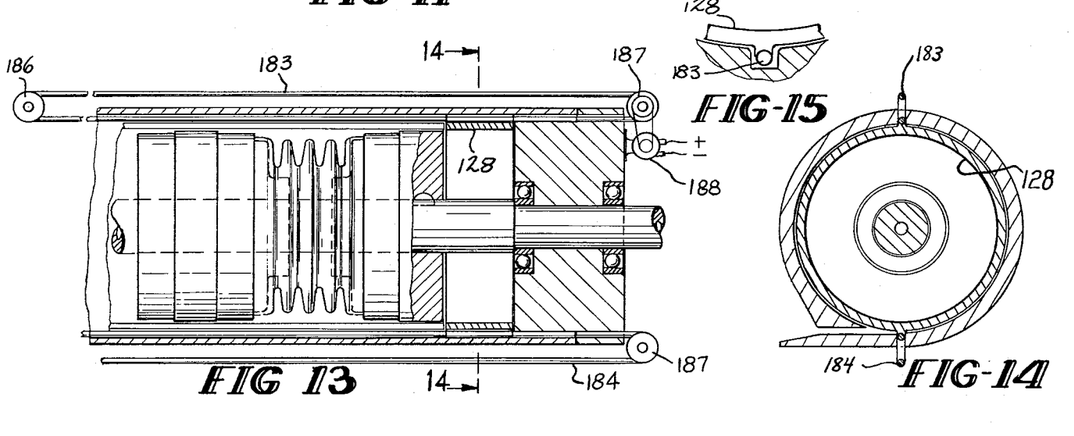
FIG. 13 is a sectional view similar to the illustration of FIG. 12 showing an alternative means for removing tube segments from the tube former.
FIG. 14 is a sectional view of FIG. 13 as observed in the plane of the line 14—14.
FIG. 15 is an enlarged view of a portion of FIG. 13.

FIGS. 13, 14 and 15 show an alternative arrangement for operating ejector sleeve 128 whereby cables 183 and 184 are secured to the sleeve 128 at diametrically opposed positions.

The cables are stretched around pulleys 186 and 187 and are operated to and fro (to the right and to the left as viewed in FIG. 13) driven by motor 188.

The ejector sleeve 128 of FIG. 13 is driven to the left to eject tube segments in response to signals generated by cam 189 and cooperating microswitch 191. Cam 192 and cooperating microswitch 193 control the reversal of motor 188 to return sleeve 128 to its normal position.

SPLIT TUBE FORMER

Figures 28, 29:
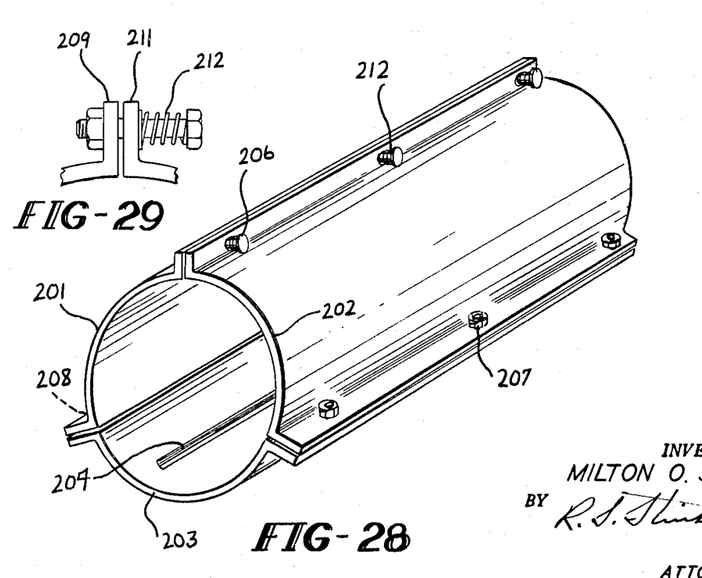

In FIG. 28 the tube former is shown split longitudinally into three generally symmetrical arcuate sectors 201, 202 and 203. The feed slot 204 is formed in sector 203 and each sector is secured to the adjacent sector by through bolts and nuts 206, 207 and 208. Although the flanges 209 and 211 are butted, coil springs 212 are carried by each bolt and are inserted between the flanges and the head of each bolt to permit the tube former to breathe or expand radially during the tube winding operation.

Obviously the preferred degree of radial expansion of the sectors and the pressure generated by the springs 212 is selected according to the thickness and composition of the tube blank material and according to the degree of calendering desired.

Furthermore, it is anticipated that the tube former may be split into any desired number of arcuate sectors.

It is anticipated that a wide variety of modifications may be devised in the basic process steps and in the essential apparatus and blank structure of the present invention without departing from the spirit and scope of the invention.

I claim:

An apparatus for fabricating convolutely wound tubular bodies comprising at least one fixed housing having a generally smooth, arcuate interior surface as viewed in cross-section, a rotatable elongated mandrel disposed in said housing, said mandrel including a plurality of deforming resilient rolls and power means cooperating with the rolls effective to swell or deform the rolls radially toward the interior surface of the housing, means for positioning said mandrel relative to said housing so that the exterior surface of the mandrel and the interior surface of the housing form a nip and a feed opening communicating with the interior of the housing so that a blank of flat sheet material fed into the housing through said opening enters nip whereupon rotation of the mandrel relative to the housing is effective to draw the blank into the housing to wind the blank convolutely into a tubular body within the housing using said interior surface as a guide.

References Cited by the Examiner
UNITED STATES PATENTS 1,857,002 5/1932 Plante ______________ 93—81
2,616,463 11/1952 Potchen ___________ 93—81 XR FRANK E. BAILEY, *Primary Examiner.*

BERNARD STICKNEY, *Assistant Examiner.*